July 17, 1928.
H. H. EDELE
1,677,586
CHILD'S VEHICLE
Filed Sept. 13, 1926
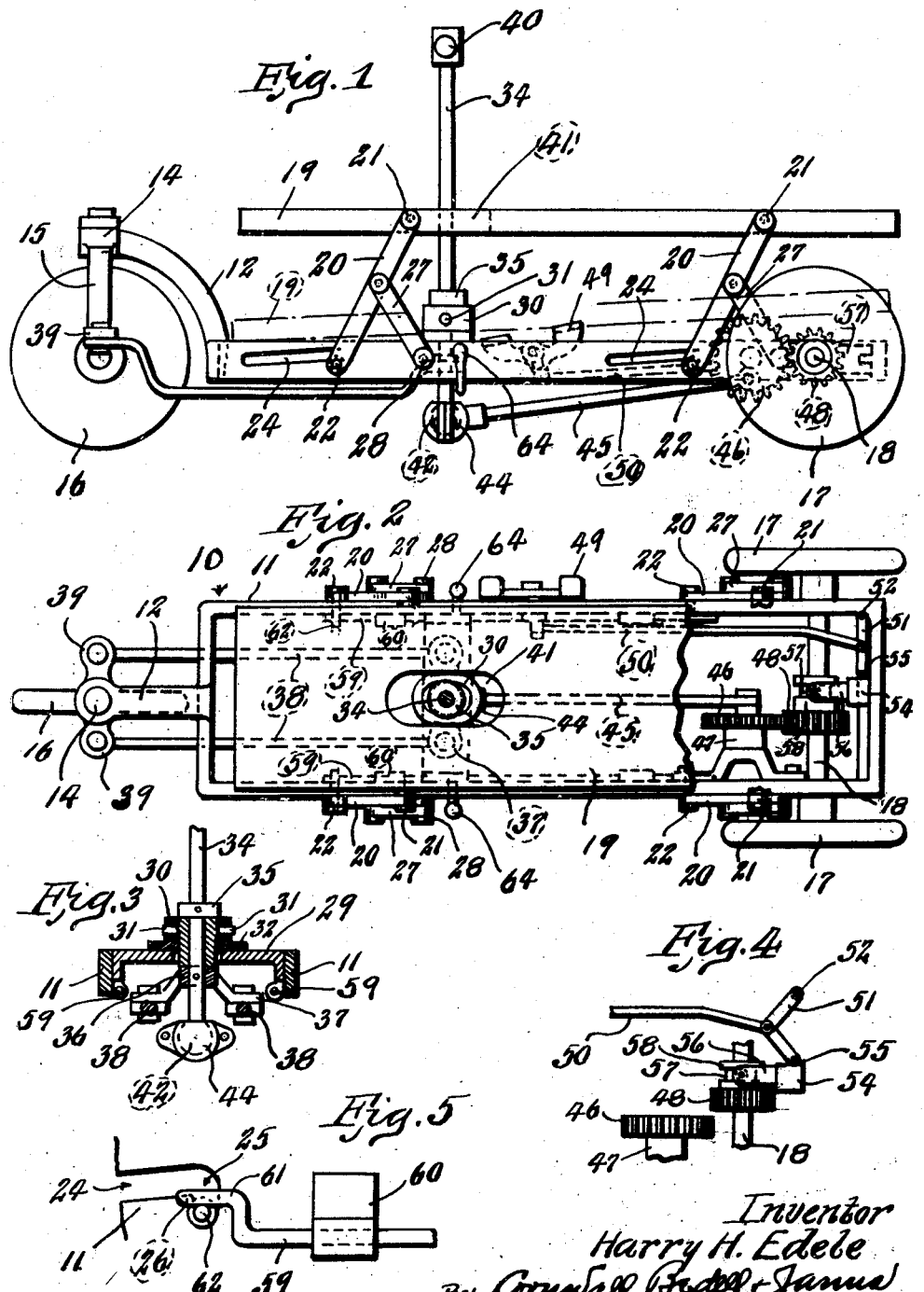
Inventor
Harry H. Edele
By Cornwall, Biddle + Janney
Attys.

Patented July 17, 1928.

1,677,586

UNITED STATES PATENT OFFICE.

HARRY H. EDELE, OF ST. LOUIS, MISSOURI.

CHILD'S VEHICLE.

Application filed September 13, 1926. Serial No. 135,081.

This invention relates to new and useful improvements in children's vehicles, the objects of the invention being to provide a vehicle having a simple driving and steering means, and provided with a platform which is adjustable upwardly into a raised position.

Other objects of the invention are to provide simple means for engaging and disengaging the driving mechanism from the rear axle of said vehicle.

Still other objects of the invention are to generally improve upon and simplify the construction of vehicles of the class described and correlate the steering means and the driving mechanism thereof so that they may be operated by means of the same member.

With these and other objects in view, my invention consists in certain novel features of construction and arrangement of parts, hereinafter more fully described and claimed, and illustrated in the accompanying drawings, in which—

Figure 1 is a side elevational view of the vehicle.

Figure 2 is a top plan view of the same with the platform partially broken away to more clearly illustrate the invention.

Figure 3 is a cross sectional detail view taken on line 3—3 of Figure 2.

Figure 4 is a detail view showing the rear axle disengaged from the driving mechanism.

Figure 5 is a detail view showing means for locking the platform in raised position.

Referring by numerals to the accompanying drawings, 10 indicates the frame or chassis of the vehicle, including side members 11 and a forwardly and upwardly curved extension 12 in which is pivotally mounted spindle 14 of a journal piece 15. A front wheel 16 is journaled in piece 15 while rear wheels 17 are carried by an axle 18, which latter has bearings in said pieces 11.

A platform 19 is arranged above frame 10 and is substantially of the same width and length as said frame. This platform is supported in position by arms 20 disposed in pairs on each side of said platform and pivotally connected thereto at their upper ends as indicated at 21. The lower ends of said arms are provided with rollers 22 which operate in slots 24 arranged in said pieces 11. These slots have their rear ends turned downwardly as indicated at 25, thereby providing shoulders 26 which, when the platform occupies raised position as shown in Figure 1, form abutments for rollers 22 and prevent the latter from riding forward in slots 24.

A link 27 is pivotally connected at one end to each arm 20 at a suitable point between roller 22 and the pivotal connection of said arm with said platform and the opposite or lower end of said link is pivotally connected to said piece 11 as indicated at 28 at a point spaced rearwardly of the rear end 25 of slot 24 and forms a support for arm 20 to hold the latter rigid when platform 19 is raised.

To lower the platform, the lower ends of arms 20 are moved upwardly to bring rollers 22 out of engagement with shoulders 26 whereupon said rollers will ride forwardly in slots 24 and bring said platform against frame 10. When in this lowered position said platform is slightly inclined upwardly and rearwardly by virtue of the fact that the rear slots 24$^a$ are slightly shorter and arrest the rollers 22 of the rear arms before the rollers of the front arms are stopped by the respective slots 24.

Fixed to side pieces 11 and extending therebetween is a transverse member 29 projecting upwardly from which are bearings 30 in which are journaled trunnions 31 of a sleeve 32. Passing through this sleeve and revolubly mounted therein is a combined steering and driving member 34 which extends upwardly from sleeve 32 a suitable distance above platform 19 and is supported on said sleeve by means of a collar 35 which bears on the upper end of said sleeve and is fixed to member 34. Fixed to said member immediately below sleeve 32 and member 29 is a tubular member 36 having lateral projections 37 to which are pivotally connected the rear ends of steering links 38. These links extend forwardly under frame 10 and have their forward ends pivotally connected to lateral arms 39 projecting from journal piece 15.

A handle 40 is fixed to the upper end of member 34 and platform 19 is provided with an elongated slot 41 to accommodate said member 34. To steer the vehicle, rod 34 is partially turned in the proper direction and this movement is transmitted through links 38 to member 15 in which the front wheel 16 is journaled.

The lower end of rod 34 extends a suitable distance below member 36 and terminates in a spherical enlargement 42 which is enclosed in a socket member 44 carried by the forward end of a connecting rod 45. The rear end of this rod is pivotally connected to a driver gear 46 which is journaled in a horizontal bearing 47 fixed to and extending inwardly from one of the side pieces 11. Meshing with this driver is a pinion 48 which is arranged on rear axle 18 in driving engagement therewith.

Thus when member 34 is oscillated on trunnions 31, rod 45 has imparted thereto reciprocatory motion and actuates driver 46 which in turn operates pinion 48 and axle 18 carrying rear wheel 17. Thus member 34 can be partially rotated to actuate the steering means without effecting the driving means by virtue of the fact that said member is freely mounted in bearing 32. Said member can be oscillated to operate the driving mechanism without effecting the steering means due to the fact that member 36 is disposed close to trunnions 31 so that the arc of movement imparted to member 36 is very slight. Furthermore, the steering links 38 have a certain amount of play at their ends to make allowance for the oscillatory movement of member 34.

The ball and socket connection between member 34 and connecting rod 45 permits revoluble movement of member 34 and at the same time provides a universal joint when said member 34 is oscillated.

When it is desired to disengage the driving connection between member 34 and axle 18, pinion 48 is moved longitudinally on said axle out of engagement with driver 46 by means of a foot treadle 49 which is disposed to one side of one of the side pieces 11 and has a pivotal connection with the forward end of rod 50, the rear end of which is pivotally connected to a toggle joint 51. One end of the latter has a fixed pivotal point as indicated at 52 and the opposite end thereof is pivotally connected to a sliding member 54 as indicated at 55. This sliding member has a bifurcated extension 56 which has an engagement with an annular groove 57 of a member 58, which latter is conjoined to pinion 48.

To bring pinion 48 in engagement with driver 46 treadle 49 is operated in the opposite direction so as to close the toggle joint 51, thereby moving pinion 48 in mesh with driver 46.

When platform 19 occupies raised position, rollers 22 are disposed in the downwardly presented ends 25 of slots 24 and in order to prevent accidental disengagement of said rollers from said ends 25 a rod 59 is slidably arranged on each side piece 11 in bearings 60 and the ends 61 of each member 59 are offset with respect to the body portion thereof and are adapted when said member 59 is slid into locking position to overlie an axial projection 62 of the pivot of the respective roller so that the latter is prevented from moving upwardly out of engagement with shoulder 26. A handle 64 is provided for each rod 59 for actuating said rod. Arms 20 and links 27 provide a rigid support for platform 19 and allow easy operation of said platform so that the vehicle may be used as a scooter with the platform occupying depressed position, or said vehicle can be used as a kiddy car with the platform occupying raised position. Such arrangement of member 34 in combination with the steering means and the driving mechanism enables the child to steer and drive the vehicle by the use of the single member while treadle 49 provides means for enabling and disabling the driving mechanism from the vehicle.

A child's vehicle constructed according to my invention is of simple and rigid construction, can be easily operated, and can be readily controlled and adjusted.

While I have shown the preferred form of my invention, it is obvious that minor changes in the size, form, and construction thereof may be made and substituted, without departing from the spirit of my invention as expressed in my claims.

I claim:

1. A child's vehicle comprising a wheeled frame, a platform therefor, a series of arms pivotally connected at their upper ends to the sides of said platform and having their lower ends adjustably mounted in the side pieces of said frame, and links pivotally connected at their ends to said side pieces and to said arms and cooperating with the latter for supporting said platform in raised position.

2. A child's vehicle comprising a wheeled frame, a platform therefor, a series of arms pivotally connected at their upper ends to the sides of said platform and having their lower ends adjustably mounted in the side pieces of said frame, links pivotally connected at their ends to said side pieces and to said arms and cooperating with the latter for supporting said platform in raised position, and means for locking the free ends of said arms against movement in said side pieces.

3. A child's vehicle comprising a wheeled frame, a platform therefor, arms pivotally mounted at their upper end to the sides of said platform and having their lower ends operating in the slots formed in the side pieces of said frame, the rear ends of said slots being provided with shoulders to maintain said arms in raised position, and links pivotally connected at one of their ends to said arms and pivotally connected at their lower ends to said side pieces rearwardly of said arms.

4. A child's vehicle comprising a wheeled frame, a platform therefor, arms pivotally mounted at their upper ends to the sides of said platform and having their lower ends operating in the slots formed in the side pieces of said frame, the rear ends of said slots being provided with shoulders to maintain said arms in raised position, links pivotally connected at one of their ends to said arms and pivotally connected at their lower ends to said side pieces rearwardly of said arms, and means for locking the free ends of said arms in engagement with said shouldered rear ends of said slots.

In testimony whereof I hereunto affix my signature this 10th day of September, 1926.

HARRY H. EDELE.